US006533897B2

(12) United States Patent
Wang et al.

(10) Patent No.: US 6,533,897 B2
(45) Date of Patent: Mar. 18, 2003

(54) THERMALLY AND STRUCTURALLY STABLE NONCOMBUSTIBLE PAPER

(75) Inventors: Roger C. Y. Wang, Richmond (CA); John Titus, Jefferson, MA (US)

(73) Assignee: FMJ Technologies, LLC, Salt Lake City, UT (US)

( * ) Notice: Subject to any disclaimer, the term of this patent is extended or adjusted under 35 U.S.C. 154(b) by 0 days.

(21) Appl. No.: 09/835,069

(22) Filed: Apr. 13, 2001

(65) Prior Publication Data

US 2002/0174963 A1 Nov. 28, 2002

(51) Int. Cl.$^7$ .............................................. D21H 13/40
(52) U.S. Cl. ..................... 162/145; 162/152; 162/146; 162/168.1; 162/181.4; 162/181.6
(58) Field of Search .................. 162/145, 152, 162/155, 135, 185, 184, 146, 181.6, 168.1, 181.4

(56) References Cited

U.S. PATENT DOCUMENTS

| | | | | |
|---|---|---|---|---|
| 3,253,978 A | * | 5/1966 | Bodendorf et al. | 162/145 |
| 4,650,621 A | * | 3/1987 | Sago et al. | 162/152 |
| 5,273,821 A | * | 12/1993 | Olson et al. | 162/145 |
| 5,679,433 A | | 10/1997 | Hayashi et al. | |
| 5,945,049 A | * | 8/1999 | Vandermeer | 162/155 |
| 6,153,674 A | | 11/2000 | Landin | |

FOREIGN PATENT DOCUMENTS

| JP | 45-24165 | * | 7/1972 | 162/152 |
|---|---|---|---|---|

OTHER PUBLICATIONS

Battista, Synthetic Fibers in Papermaking, (1964), Interscience Publishers, pp189, 190, 193, 197, 199, 214–223, 280–282.*

* cited by examiner

*Primary Examiner*—Peter Chin
(74) *Attorney, Agent, or Firm*—Kirton & McConkie; Michael F. Krieger

(57) ABSTRACT

The present invention is drawn to a thermally and structurally stable, noncombustible paper, comprising a dominant amount of aluminosilicate refractory fibers and from 0.2% to 4% by weight of a polymeric binder. The refractory fibers can be substantially from 1 micron to 35 microns in width and from 1 cm to 15 cm in length, though other functional dimensions can be used. Optionally, from 0.1% to 5% by weight of viscose fibers and/or from 0.2% to 5% by weight of silicic acid aquagel can also be present. The papers of the present invention are mat-type papers that can be structurally stable at very high temperatures up to about 1400° C. or more.

9 Claims, No Drawings

THERMALLY AND STRUCTURALLY STABLE NONCOMBUSTIBLE PAPER

FIELD OF THE INVENTION

The present invention is drawn to thermally and structurally stable noncombustible papers and methods of making the same.

BACKGROUND OF THE INVENTION

In recent years, there has been an increased demand for lightweight sheet-like products that are fire retardant, or even noncombustible. This is particularly true after the health hazards of such materials such as asbestos have become known. Aside from the health risks associated with asbestos, asbestos was a good product for several reasons including its ability to conform with water during the paper making process. Additionally, asbestos products have shown good adsorptivity and scavenging properties in mixing with other additives.

Because asbestos has been restricted in recent years due to certain health concerns, alternative fibrous products having similar properties have become of interest. For example, highly efficient inorganic fibers have been developed including plaster fibers, basic magnesium sulfate fibers, phosphoric acid fibers, pyroboric acid magnesium fibers, potassium titanate fibers, alumina-silica fibers, and glass fibers, to name a few. Additionally, some fire retardant products have been developed including products focused on the coating of papers with an anti-flaming agent. Such anti-flaming agents have included ammonium salt complex type aqueous inorganic salts, phosphorus complex nitrogen compounds, phosphorus complex hologen compounds, antimonytrioxidehalogen compounds, boron compounds, halogen compounds, and the like. These coating systems are typically composed of organic substances, and because they are mere coatings, it is very difficult to form a sheet-like material that is totally noncombustible.

Therefore, based upon what is known about the prior art, it has been recognized that a fibrous paper product that is structurally stable at very high temperature, such as when in contact with a flame, would be a significant advancement in the paper insulation art.

SUMMARY OF THE INVENTION

The present invention is drawn to a noncombustible fibrous paper comprising a dominant amount of aluminosilicate refractory fibers by weight, wherein the fibers are substantially from 1 micron to 35 microns in width and from 1 cm to 15 cm in length; and from 0.2% to 4% by weight of a polymeric binder distributed throughout the paper. The polymeric binder can be, for example, a vinyl acetate/ethylene copolymer emulsion. The paper is a mat product that is structurally stable at very high temperatures, preferably at temperatures of at least 1000° C. and up to 1400° C. or more. Though not required, it is preferred that the aluminosilicate refractory fibers be present at from 90% to 99.8% by weight. From 0.1% to 5% by weight of viscose fibers and/or from 0.2% to 5% by weight of silicic acid aquagel, each by weight, can also be present.

Additionally, a method of making a thermally stable noncombustible paper is disclosed comprising the steps of pulping aluminosilicate refractory fibers, adding an effective amount of a polymeric binder forming a continuous pulp, pressing the continuous pulp, and dehydrating the continuous pulp.

DETAILED DESCRIPTION OF THE INVENTION

Before the present invention is disclosed and described, it is to be understood that this invention is not limited to the particular configurations, process steps and materials disclosed herein as these may vary to some degree. It is also to be understood that the terminology used herein is used for the purpose of describing particular embodiments only, and is not intended to be limiting as the scope of the present invention. The invention will be limited only by the appended claims and equivalents thereof.

It must be noted that, as used in this specification and the appended claims, singular forms of "a," "an," and "the" include plural referents unless the content clearly dictates otherwise.

"Refractory fibers" are fibers that are resistant to heat and corrosion.

"Aluminosilicate refractory fibers" contain primarily two ingredients: silica (silicon dioxide) and alumina (aluminum dioxide). They are typically present in roughly equal proportions. However, the relative proportions of silica and alumina in the noncombustible paper of the present invention is not critical to the character and quality of the paper, though substantial amounts of both must be present. Thus, as a practical matter, the weight ratio of silica to alumina can be from 7:3 to 3:7. Other trace ingredients can also be present such as <1.0% $Fe_2O_3$, and <0.5% $Na_2O+K_2O$, though these amounts are not limiting.

"Paper" refers to a fibrous product produced by one of a number of paper making processes. Typically, the paper is a compressed mat-type product rather than a woven product. The papers of the present invention are not self-supporting and have many typical paper-like properties, e.g., rollable, foldable, tearable, creasable without breaking, collapseable, bendable, etc. The paper can provide the ability to surround structures of different dimension. In other words, the papers can be collapsible and re-expandable. Additionally, the papers are non-thermally expandable and structurally stable under extreme heat conditions. For example, after applying a 1000° C. flame to a paper of the present invention, the paper will not blacken or expand. Thus, until a specific paper reaches a disintegration temperature, e.g. preferably greater than 1000° C., it will remain structurally sound.

"Structurally stable" or "thermally stable" when referring to the papers of the present invention shall mean that the papers will not be significantly physically altered at very high temperatures where direct flame contact with the paper may occur. A very high temperature that can be present in a typical fire can be, for example, at least 230° C., though the papers of the present invention can typically withstand much higher temperatures than this. For example, with respect to the preferred embodiments, the papers of the present invention can withstand temperatures of at least 1000° C. and up to as much as 1400° C. or more, without substantial degradation. Thus, as the paper is structurally stable as defined herein, no substantial expansion or shrinkage, e.g., less than about 3.5% in volume, will occur at very high temperatures, e.g., up to about 1400° C. Components other than aluminosilicate refractory fibers can burn off at certain temperatures, e.g., as a gas, though such burn off is not noticeable by casual observation. Thus, in one embodiment, after applying a flame of about 1000° C. and allowing the paper cool, the appearance of the paper will remain substantially the same.

"Paper making process" is any process wherein the aluminosilicate refractory fibers (with or without other components) are pulped, compressed, and dehydrated.

"Noncombustible" refers to the fact that the papers of the present invention will not substantially combust under extreme heat, but will merely disintegrate into smaller components. For example, many of the papers of the present invention will not disintegrate under a flame of greater than 1000° C. However, the papers typically will disintegrate when exposed to an oxy-acetylene torch (2400° F.), but will not combust.

"Polymeric binder" shall include any polymeric material that is functional in creating binding properties with respect to the aluminosilicate refractory fibers. Though the use of a copolymer emulsion such as vinyl acetate/ethylene is preferred, certain other monomers and copolymers can be used. For example, the polymeric binder can comprise polyvinyl chlorides, polyvinyl acetates, polyvinylidene chlorides, polyvinyl alcohols, polystyrenes, polyethylene terephthalate, polyethylene, polypropylene, polychloroprene, styrene butadiene copolymers, butadiene acrylonitrile copolymers, polyisoprene polyurethanes, polybutadiene, polyacrylates, natural rubbers, silicone, metallic resinates, waxes, acrylic resins, thermoset resins (e.g., epoxies and phenolics), and mixtures and combinations thereof.

"Second noncombustible material" can include any fibrous material that is noncombustible, such as, for example, glass fibers, glass ceramic fibers, ceramic fibers, mineral fibers, metal fibers, and/or carbon fibers.

The present invention is drawn more specifically to thermally and structurally stable ceramic fiber papers and methods of making these papers. These papers comprise low residue ceramic fibers and are generally formed using wet a paper-making continuous process. With the papers or mat products of the present invention, the momentary reaching temperature can be as high as 1400° C. before disintegration occurs. Additionally, working temperatures over 1000° C. can be reached without significant degradation or disintegration. At no known temperature will the papers of the present invention combust.

The papers of the present invention exhibit many desirable characteristics in very high temperature environments. For example these papers exhibit low heat conductivity, have low heat melting properties, and have favorable properties with respect to heat-vibration. Additionally, at an appropriate thickness, the papers of the present invention can have very high strength, while maintaining their flexibility. Specifically, by high strength, what is meant is that the papers of the present invention have good initial tear resistance, good tear propagation strength, and good tensile strength. In addition to their low heat conductivity, the added benefits of good electrical and sound insulation are also realized when used in applications where these properties are desirable.

The noncombustible papers of the present invention can be used in many different industries including, but not limited to, the aero industry, the electrical industry, the heat insulation industry, and the automobile industry. For example, heat protection can be provided in the aero industry, heat insulation can be provided for furnaces, and sound insulation can be provided for buildings and automobiles.

Specifically, the noncombustible fibrous papers of the present invention can comprise a dominant amount of aluminosilicate refractory fibers by weight. Typically, this will be from about 90% to 99.8% by weight. Additionally, the fibers used can be substantially from 1 micron to 35 microns in width and from 1 cm to 15 cm in length. Further, the aluminosilicate refractory fibers can comprise from 30% to 70% silica by weight and from 70% to 30% alumina by weight. However, in many instances, the silica and the alumina are present in substantially equal proportions by weight.

As stated, the presence of an effective amount binder must be present in the in order to hold the refractory fibers substantially together in the form of a paper. Anywhere from about 0.2% to 4% by weight of a polymeric binder distributed throughout the paper can be used. The binder can be any carbon-based product that provides strength to the noncombustible paper product. An appropriate polymeric binder that can be used is, for example, a vinyl acetate/ethylene copolymer emulsion. Alternatively, the polymeric binder can comprise any of the following polymers: polyvinyl chlorides, polyvinyl acetates, polyvinylidene chlorides, polyvinyl alcohols, polystyrenes, polyethylene terephthalate, polyethylene, polypropylene, polychloroprene, styrene butadiene copolymers, butadiene acrylonitrile copolymers, polyisoprene polyurethanes, polybutadiene, polyacrylates, natural rubbers, silicone, metallic resinates, waxes, acrylic resins, thermoset resins (e.g., epoxies and phenolics), and mixtures and combinations thereof. If desired, a second polymeric binder can also be added to the pulp prior to dehydration, or can be added as a coating to the compressed pulp (before or after dehydration). In one embodiment, the coating can be a vinyl acetate/ethylene copolymer emulsion, though any of the polymers described previously can also act as the second polymer binder.

Though not required, the paper can also include from 0.1% to 5% by weight of a textile filler. Any known textile filler can be used such as, for example, viscose fiber. Further, the noncombustible paper can also comprise from 0.2% to 5% by weight of silicic acid aquagel. The silicic acid aquagel in the paper of the present invention hardens into roughly spheroid shapes or shots during dehydration of the pulp. The size of the shots in the paper product can be from 40 to 400 microns in width, though this is not critical. In other words, once the silicic acid aquagel is dehydrated during the paper making process, it becomes an amorphous adhesive.

In addition to the silicic acid, incidental amounts of a mineral oxide can be present. For example, a aggregate amount of mineral oxide from about 0.1% to 3% can be present, though this is not important to the present invention. These ingredients can be inherently present in the aluminosilicate refractory fibers, or they can be added separately during the paper making process. Additionally, a second non-combustible material can be used such as, for example, glass fibers, glass ceramic fibers, ceramic fibers, mineral fibers, metal fibers, and/or carbon fibers in effective amounts.

A method of making a noncombustible paper is also disclosed comprising the steps of pulping aluminosilicate refractory fibers, adding an effective amount of a polymeric binder (e.g., vinyl acetate/ethylene copolymer) forming a continuous pulp, pressing the continuous pulp, and dehydrating the continuous pulp. The method produces a mat paper that is structurally stable at very high temperatures such as when in contact with a flame, e.g., up to 1400° C.

Optional steps of coating the paper with a polymeric coating can be carried out. The coating can be any polymeric binder such as, for example, a vinyl acetate/ethylene copolymer emulsion. Additionally, the step of adding an effective amount of a textile filler can also be carried out. An effective amount of a viscose fiber can be used for the textile filler. Further, an effective amount of silicic acid aquagel can also be added.

Though not required, the aluminosilicate pulp should be cleaned prior the addition of other ingredients. Additionally, it is preferred that low granule-content aluminosilicate fibers be selected for pulping of the aluminosilicate refractory fibers. Water can also be removed by applying a vacuum to the aluminosilicate-containing pulp. After the aluminosilicate-containing pulp is dehydrated, it can be sized at that point. Prior to pulping, the fibers can be extruded to form textile fibers of having a predetermined dimension. The preferred predetermined dimension can be from 1 micron to 35 microns in width and from 1 cm to 15 cm in length.

Papers prepared in accordance with the principles of the present invention can have many favorable properties. Table 1 below is provided which illustrates some of the target properties that can be achieved with many of the papers of the present invention.

TABLE 1

| Property | Performance |
| --- | --- |
| Short term use temperature | 1400° C. |
| Continuous use temperature | 1000° C.+ |
| Color | White |
| Density | 180~240 kg/M$^3$ |
| Organics present | 0.2~8% |
| Shrinkage | <3.5% |
| Thermal conductivity | <0.07 W/M.K |
| Tensile strength | >0.13 KN/M |

These physical properties and others can vary to some degree, depending on the exact formulation. For example, though any functional thickness can be prepared, from 0.3 mm to 3.0 mm of thickness is preferred. Likewise, any width can be formed, though from 0.3 m to 1.0 m is an appropriate width for a typical paper making machine. Additionally, the weight can be any functional weight, though from 50 to 300 g/m$^2$ is preferred.

EXAMPLES

The following examples illustrate the preferred embodiments of the invention that are presently best known. However, other embodiments may be practiced which are also within the scope of the present invention.

Example 1

A noncombustible paper was manufactured by the following process. First, aluminosilicate refractory fibers comprising about 45% alumina by weight, 51% silica by weight, less than 1.0% $Fe_2O_3$ by weight, and less than 0.5% by weight of cumulative amounts of $Na_2O$ and $K_2O$ were obtained. Small amounts of other incidental trace components were also present with the fibers. The fiber diameters ranged from about 2 to 3 um and about 3 cm in length. These fibers were then pulped and cleaned. To the pulp was added about 3% a viscose fiber textile filler by weight, about 2% of a vinyl acetate/ethylene copolymer emulsion by weight, and about 1% silicic acid aquagel by weight. The pulp containing the additives was formed on a pre-drainer, dehydrated, and cut to size. The paper produced was noncombustible and was able to withstand a continuous flame temperature of over 1000° C. without substantial degradation.

Example 2

A noncombustible paper was manufactured by the following process. First, aluminosilicate refractory fibers were obtained comprising about 55% alumina by weight, 44% silica by weight, about 0.2% $Fe_2O_3$ by weight, and about 0.2% by weight of cumulative amounts of $Na_2O$ and $K_2O$. Small amounts of other incidental trace components were also present. The fiber diameters were from about 3 to 4 um and about 3 cm in length. Next, the fibers were pulped and cleaned. To the pulp was added about 2% a viscose fiber textile filler by weight, about 1% of a vinyl acetate/ethylene copolymer emulsion by weight, and about 1% silicic acid aquagel by weight. The pulp containing the additives was formed on a pre-drainer, dehydrated, and cut to size. The paper produced was noncombustible and was able to withstand a continuous flame temperature of over 1200° C. without substantial degradation.

Example 3

The papers of Examples 1 and 2 were placed under an oxy-acetylene torch (2400° F.), which is the hottest known flame available. Under these extreme heat conditions, the papers of Examples 1 and 2 disintigrated, but did not combust.

Example 4

A noncombustible paper was manufactured by the following process. First, aluminosilicate refractory fibers comprising about 45% alumina by weight, 51% silica by weight, less than 1.0% $Fe_2O_3$ by weight, and less than 0.5% by weight of cumulative amounts of $Na_2O$ and $K_2O$, were selected. Small amounts of other incidental trace components were also present in the fibers. The fiber diameters were from about 2 to 3 um and about 3 cm in length. Next, the fibers were pulped and cleaned. To the refractory fibers was added 10% glass fibers by weight based on the total weight percentage of the noncombustible paper. Additionally, about 3% a viscose fiber textile filler by weight, about 2% of a vinyl acetate/ethylene copolymer emulsion by weight, and about 1% silicic acid aquagel by weight was added. The pulp containing the additives was formed on a pre-drainer, dehydrated, and cut to size. The paper produced was noncombustible. While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A noncombustible paper comprising:

(a) from 90% to 99.5% by weight of aluminosilicate refractory fibers, said fibers being substantially from 1 micron to 35 microns in width and from greater than 1 cm to 15 cm in length;

(b) from 0.1% to 5% by weight of viscose fibers;

(c) from 0.2% to 5% by weight of silicic acid aquagel; and (d) from 0.2% to 4% by weight of a vinyl acetate/ethylene copolymer emulsion.

2. A noncombustible paper as in claim 1 wherein the vinyl acetate/ethylene copolymer emulsion binder is in the form of a coating.

3. A noncombustible paper as in claim 1 wherein said paper is a mat product produced by a paper making process, and wherein said paper is structurally stable when in contact with a flame at very high temperatures up to about 1400° C.

4. A noncombustible paper as in claim 1 wherein said paper is structurally stable when exposed to a continuous flame having temperatures of at least 1200° C. without substantial disintegration.

5. A nonconbustible paper as in claim 1 wherein the aluminosilicate refractory fibers comprise from 30% to 70% silica by weight and from 70% to 30% by weight alumina.

6. A noncombustible paper as in claim 5 wherein the silica and the alumina are present in substantially equal proportions by weight.

7. A noncombustible paper as in claim 1 further comprising from 0.1% to 3% of one or more mineral oxide by weight.

8. A noncombustible paper as in claim 1 wherein the paper has a density from about 180 to 240 kg/M$^3$.

9. A noncombustible paper as in claim 1 wherein the paper is from 0.3 mm to 3.0 mm in thickness.

* * * * *